United States Patent [19]

Gould et al.

[11] 4,144,616

[45] Mar. 20, 1979

[54] WIRE GUIDE BUSHING AND METHOD OF PRODUCTION

[75] Inventors: Charna Gould; William Gould, both of Millburn, N.J.

[73] Assignee: Nyltite Corporation of America, South Plainfield, N.J.

[21] Appl. No.: 850,144

[22] Filed: Nov. 10, 1977

[51] Int. Cl.² .......................................... B65D 55/00
[52] U.S. Cl. ................................... 16/2; 174/153 G; 248/56
[58] Field of Search ....................... 16/2, 108; 85/1 R; 174/153 G, 152 G, 65 G; 308/237 R, 238; 248/56; 277/178; 24/144; 285/192, 130, 213

[56] References Cited

U.S. PATENT DOCUMENTS

| | | | |
|---|---|---|---|
| 2,762,989 | 9/1956 | Johnson | 248/56 X |
| 3,033,624 | 5/1962 | Biesecker | 174/153 G X |
| 3,203,304 | 8/1965 | Rapata | 277/178 X |
| 3,215,303 | 11/1965 | Dearle | 174/153 G X |
| 3,358,136 | 12/1967 | Greasley | 248/56 X |
| 3,844,588 | 10/1974 | Jocsak | 248/56 X |

*Primary Examiner*—Louis Rimrodt
*Assistant Examiner*—Moshe I. Cohen
*Attorney, Agent, or Firm*—Howard C. Miskin

[57] ABSTRACT

A wire guide bushing includes a thin-walled nylon tube which is outwardly flared at its proximal end, the border of the flared portion being folded forwardly to overly the flared portion outer face and form a double thickness wall. The tube is peripherally outwardly bulged shortly forwardly of the flared portion and the bushing is applied merely by inserting the bushing in a panel opening and forcing it past the bulge to embrace the opening border between the peripheral bulge and flared portion. In producing the guide bushing the tube is partially nested in a well in a block with the flared portion outermost and a tool with a cylindrical shank and an enlarged head with a concave underface is inserted in the tube and pressed downwardly against the flared portion edge to outwardly peripherally bulge the tube between the block and flared portion.

6 Claims, 3 Drawing Figures

WIRE GUIDE BUSHING AND METHOD OF PRODUCTION

BACKGROUND OF THE INVENTION

The present invention relates generally to improvements in wire guides and methods of producing the same and it relates more particularly to an improved wire guide bushing for use in openings in walls, panels, plates and the like and to an improved method of producing such bushing.

In the installation, replacement and servicing of electrical networks and power lines in buildings of domestic, commercial and industrial types, it is generally necessary to draw the insulator covered wires or cables through restricted openings such as in the walls of junction or switch boxes or in other walls, panels or plates. This procedure is often made difficult by reason of the passage of the wire or cable through the restricted opening because of the sharp and often ragged and highly abrasive nature of the opening edges which not only abrades and often damages the wire to the point of rupturing the insulator cover but also retards the easy passage of the advancing wire, thereby necessitating a greater force in pulling the wire. Various expedients have been employed to overcome the difficulties encountered in drawing wires through wall openings but these possess numerous drawbacks and disadvantages. They are unreliable devices frequently difficult to apply and only partially overcoming the commonly encountered problems, are of little versatility and adaptability and otherwise leave much to be desired.

SUMMARY OF THE INVENTION

It is a principal object of the present invention to provide an improved guide device and a method of producing the same.

Another object of the present invention is to provide an improved wire guide bushing and an improved method for producing such bushing.

Still another object of the present invention is to provide an improved wire guide bushing highly useful and easily applicable to openings in walls of junction or switch boxes or the like and to an improved method for producing such bushing.

A further object of the present invention is to provide a device of the above nature characterized by its reliability, low cost, ease and convenience of use and great versatility and adaptability.

In a sense the present invention contemplates the provision of an improved wire guide bushing device comprising a tubular body or sleeve member formed of a polymeric resin and having an enlarged head portion at its trailing proximal end, the sleeve member having formed therein shortly forward of said enlarged head portion an outwardly projecting peripheral flange. In producing the bushing device according to the improved method a short tube is nested in a cylindrical well with part of the tube projecting above the well and a tool with a cylindrical shank and an enlarged head is inserted into the tube and pressed into the tube to advance the shank along the tube and well bores and advance the head against the outer end of the tube to outwardly peripherally bulge the tube at the border of the well.

In its preferred construction, the guide bushing is formed of nylon and its proximal end is outwardly flared, the trailing border of the flared portion being outwardly forwardly folded to overly the adjacent wall portion and the peripheral bulge is of approximately sinusoidal configuration and is spaced from the inner end of the flared portion by a short length of the undeformed sleeve. In the applied condition of the guide bushing in a circular opening, the border of the opening is embraced between the rear base of the peripheral bulge and the free edge of the sleeve folded border. The peripheral bulge is advantageously formed after the flared proximal end is formed, the tool having a concave underface which bears on the trailing end of the bushing flared portion and is perpendicular to the plane of the flared portion.

The improved guide bushing is a highly reliable device, easy and convenient to apply, simple and inexpensive to produce by the improved method and of great versatility and adaptability.

DESCRIPTION OF THE PREFERRED EMBODIMENT

Figure 3:
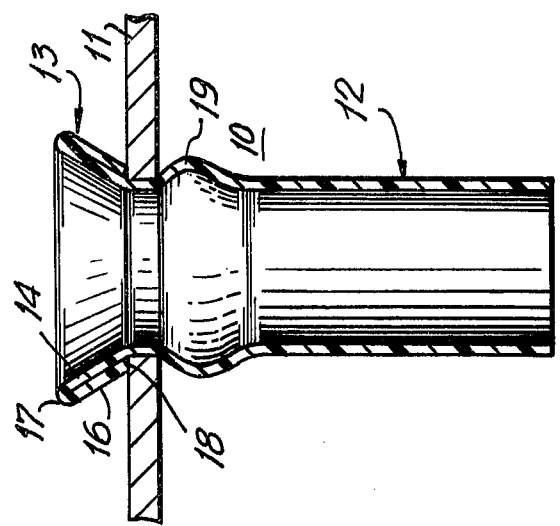
FIG. 3 is a medial longitudinal sectional view showing the finished bushing applied to a wall opening.

Referring now to the drawing which illustrates a preferred embodiment of the present invention, the reference numeral 10 generally designates the improved wire guide bushing which is shown as applied to a matching opening in a plate or wall 11 which may be a wall of a junction or switch box or the like. The guide bushing 10 is integrally formed of a thermoplastic polymeric resin having the cold flow properties of nylon, and is preferably a nylon of the type described in U.S. Pat. No. 3,299,766 granted Jan. 24, 1967 to W. Gould et al. In addition to the desired cold flow properties nylon is highly abrasive-resistant of low abrasion and friction to permit the sliding of wire thereover with a minimum of retardation and abrasion.

The guide bushing 10 includes a tubular front or distal section 12 of uniform circular cross-section and an outwardly rearwardly flared rear shoulder or proximal section 13 which, as shown in the drawings, is funnel shaped. The flared proximal section 13 includes superimposed inner and outer walls 14 and 16 respectively joined at their common outer edge 17 and formed by forwardly outwardly folding the trailing border of the resin tube, for example by the method described in U.S. Pat. No. 3,942,931, issued Mar. 9, 1976, and then outwardly flaring the two-ply trailing end in any suitable manner. The free end of the flare outer ply 16 defines a forwardly directed peripheral shoulder 18.

Figure 2:
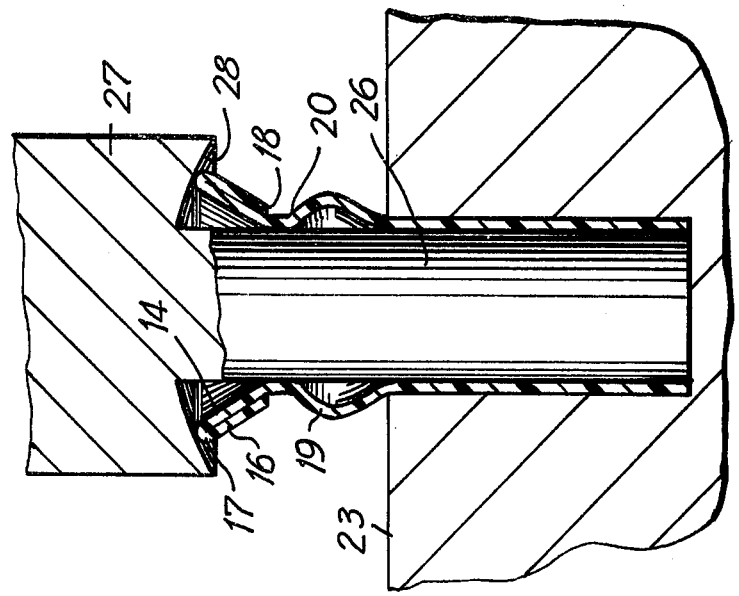
FIG. 2 is a view similar to FIG. 1 showing the final step in the forming of the guide bushing.

Formed in the rear portion of the distal section 12, in the manner hereinafter described, is an outwardly projecting curved peripheral bulge 19 of approximately sinusoidal cross-section and a corresponding opposite inner peripheral groove as shown in FIGS. 2 and 3 of the drawings. Advantageously the rear peripheral base edge 20 of peripheral bulge 19 is longitudinally spaced from the shoulder 18 a distance equal to slightly less than the thickness of the wall 11 to which the guide bushing 10 is applied.

In fabricating the guide bushing 10 a nylon or other resin tube 21 has its lower portion slideably inserted in telescoping or nesting position in a matching cylindrical well 22 in a female die block 23, the bottom of the tube 21 abutting the base of well 22 and the peripheral face of tube 21 slideably engaging the peripheral face of well 22. Cooperating with the die block 23 is a male die tool 24 including a lower cylindrical shank 26 coaxial with well 22 and of a diameter approximately equal to the inside diameter of tube 21. Integrally formed atop the shank 26 is a radially enlarged cylindrical head 27 of greater diameter than the maximum diameter of flared section 13. The head 27 is coaxial with shank 26 and has a concave underface 28 which, when in engagement with flare outer edge 17, as shown in FIG. 2 is perpendicular to walls 14 and 16 which are radial relative to the head underface 28. The length of the shank 26 is such, that when it is fully inserted in well 22, as shown in FIG. 2, the finished guide bushing 10 is longitudinally entrapped between the head underface 28 and the base of well 22.

Figure 1:
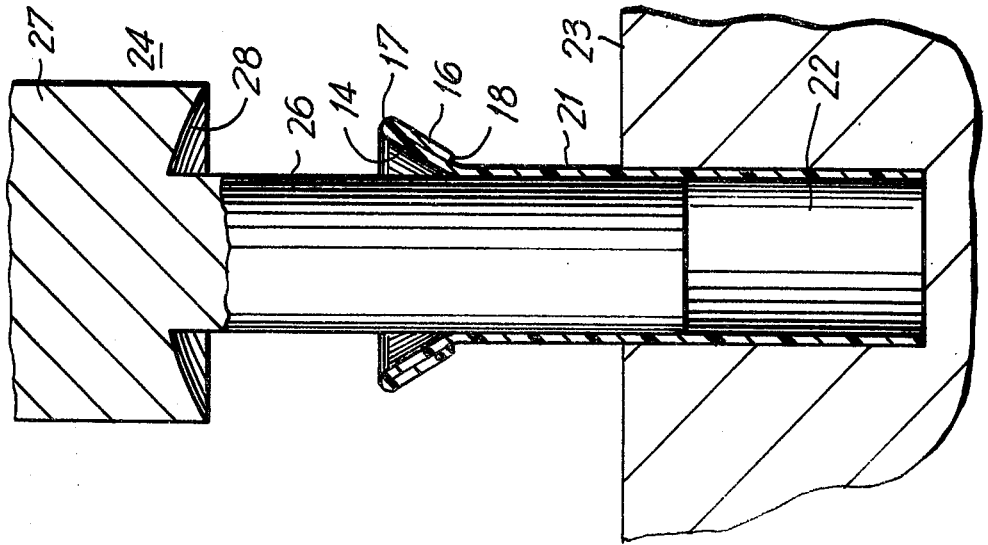
FIG. 1 is a medial longitudinal sectional view illustrating a step in the production of the improved guide bushing.

In forming the bulge 19, the tube 21, having its proximal end flared as above explained, is fully telescopically inserted in the well 22 as shown in FIG. 1 and thereafter the tool 24 is fully depressed until lower end of shank 26 engages the base of well 22. The lowering of the head 27 against the flared wall 14 imparts a pressure thereto longitudinally parallel to wall 14 to inhibit the collapse of wall 14 and to apply a vertical pressure to the wall jet section 12 above the top face of block 23 which causes its outward bulging to form peripheral bulge 19 and the corresponding inner groove. The dimensions of the tool and die are such as to achieve the bulge 19 of the desired configuration.

In applying the improved guide bushing 10 to the opening, for example, in wall 11, the front end portion 12 is inserted in the wall opening until the bulge 19 reaches the opening edge. Longitudinal pressure is then applied to the flared end by means of a suitable tool by striking or pressing the flare outer edge 17. As a result the wall opening edge acts on the cam defining front outer face of bulge 19 to compress the bulge 19 inwardly and permit its passage through the opening until flare wall shoulder 18 engages a face of wall 11. Upon passage through the opening in wall 11 the bulge 19 expands to effect the tight embrace of the wall 11 between section 13 and the rear base edge of the bulge 19.

While there has been described and illustrated a preferred embodiment of the present invention, it is apparent that numerous alterations, omissions and additions may be made without departing from the spirit thereof.

I claim:

1. A guide bushing device integrally formed of a polymeric resin and including a tubular body of cylindrical configuration along its distal portion and having an outwardly rearwardly flared, funnel shaped proximal end portion, said tubular body being outwardly peripherally bulged to form an outer continuous peripheral ridge of curved transverse cross-section proximate the distal end of said flared proximal end portion.

2. The guide bushing device of claim 1 wherein said resin is cold flowing.

3. The guide bushing device of claim 2 wherein said resin is nylon.

4. The guide bushing device of claim 3 including a forwardly directed peripheral shoulder located along the outer face of said flared portion proximate the forward end thereof and spaced rearwardly of said peripheral ridge.

5. The guide bushing device of claim 4 wherein said flared portion includes superimposed inner and outer walls joined along their rear edges, said outer wall having a front peripheral edge defining said shoulder.

6. In combination with the guide bushing device of claim 5 a wall having an opening formed therein, said bushing device projecting through said opening and said wall bordering said opening being embraced between said shoulder and the rear face of said peripheral ridge.

* * * * *